(12) United States Patent
Imajo et al.

(10) Patent No.: US 6,986,542 B2
(45) Date of Patent: Jan. 17, 2006

(54) RETRACTABLE SEATS

(75) Inventors: Taku Imajo, Toyota (JP); Makoto Sakai, Aichi-ken (JP)

(73) Assignee: Araco Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 10/786,675

(22) Filed: Feb. 25, 2004

(65) Prior Publication Data

US 2004/0169404 A1   Sep. 2, 2004

(30) Foreign Application Priority Data

Feb. 28, 2003 (JP) .............................. 2003-053256

(51) Int. Cl.
    *B60N 3/20*   (2006.01)
(52) U.S. Cl. ................. 296/65.09; 296/65.08; 296/65.12; 296/69; 297/340
(58) Field of Classification Search ............ 296/63, 296/65.01, 65.05, 65.09, 65.11, 65.12, 65.16, 296/66, 65.17, 69, 65.18; 297/340, 316, 297/378.1
    See application file for complete search history.

(56) References Cited

U.S. PATENT DOCUMENTS

| | | | |
|---|---|---|---|
| 480,307 A * | 8/1892 | Wells .......................... 296/66 |
| 4,957,321 A | 9/1990 | Martin et al. | |
| 5,269,581 A | 12/1993 | Odagaki et al. | |
| 5,890,758 A | 4/1999 | Pone et al. | |
| 6,070,934 A * | 6/2000 | Schaefer et al. ............... 297/14 |
| 6,106,046 A * | 8/2000 | Reichel .................. 296/65.09 |
| 6,113,191 A * | 9/2000 | Seibold .................... 297/378.1 |
| 6,234,553 B1 | 5/2001 | Eschelbach et al. | |
| 6,270,141 B2 * | 8/2001 | Moon et al. ............. 296/65.17 |
| 6,293,603 B1 | 9/2001 | Waku et al. | |
| 6,382,491 B1 * | 5/2002 | Hauser et al. ........... 296/65.05 |
| 6,435,589 B2 | 8/2002 | Shimizu et al. | |
| 6,601,900 B1 | 8/2003 | Seibold | |
| 6,672,662 B1 * | 1/2004 | Balk .......................... 297/244 |
| 6,817,669 B2 * | 11/2004 | Roth et al. .................. 297/340 |
| 2001/0001526 A1 * | 5/2001 | Moon et al. ............. 296/65.17 |
| 2003/0001419 A1 * | 1/2003 | Roth et al. ............... 297/378.1 |
| 2004/0245829 A1 * | 12/2004 | Haladuda et al. .......... 297/340 |

FOREIGN PATENT DOCUMENTS

| | | | |
|---|---|---|---|
| DE | 3628695 A1 * | 3/1988 |
| JP | 56082637 A * | 7/1981 |
| JP | 58067528 A * | 4/1983 |
| JP | 2002-316567 | 10/2002 |
| WO | WO 0041910 | 7/2000 |

* cited by examiner

*Primary Examiner*—Patricia L. Engle
(74) *Attorney, Agent, or Firm*—Patterson, Thuente, Skaar & Christensen, P.A.

(57) ABSTRACT

A retractable seat to be attached to a floor may include a seat cushion, a seat back rotatably supported on the seat cushion, and a link mechanism for supporting the seat cushion on the floor. The link mechanism includes a front leg and a rear leg that are pivotally connected to the seat cushion and the floor so that the seat can be switched between a use condition and a retracted condition. The front and rear legs respectively have a different link length so as to produce a difference between a rotating range of the front leg and a rotating range of the rear leg. The seat may further include a compensation mechanism for compensating for the difference between the rotating ranges of the front and rear legs within an operating range of the link mechanism.

15 Claims, 19 Drawing Sheets

RETRACTABLE SEATS

BACKGROUND OF THE INVENTION

1. Field of the Invention

The present invention relates to retractable seats for a vehicle. More particularly, the present invention relates to retractable seats in which the seat can be retracted when a seat cushion is brought down to the floor side by means of a link mechanism.

2. Description of the Related Art

A retractable seat of this type is taught, for example, by Japanese Laid-Open Patent Publication No. 2002-316567.

In the known art, the seat is vertically movably supported on a vehicle floor by means of front and rear links. Floor support points of the front and rear links are disposed in a receiving recess formed in the vehicle floor. Due to the front and rear links, the seat can be moved between a retracted condition in which the seat is retracted in the receiving recess and a use condition in which the seat is positioned above the receiving recess.

However, in the retractable seat thus arranged and constructed, the receiving recess must be enlarged in order to receive the seat therein, because the floor support points of both of the front and rear links are disposed in the receiving recess.

SUMMARY OF THE INVENTION

It is, accordingly, one object of the present teachings to provide an improved, retractable vehicle seat.

For example, in one aspect of the present teachings, a retractable seat to be attached to a floor may include a seat cushion, a seat back rotatably supported on the seat cushion, and a link mechanism for supporting the seat cushion on the floor. The link mechanism includes a front leg and a rear leg that are pivotally connected to the seat cushion and the floor so that the seat can be switched between a use condition and a retracted condition. The front and rear legs respectively have a different link length so as to produce a difference between a rotating range of the front leg and a rotating range of the rear leg. The seat may further includes a compensation mechanism for compensating for the difference between the rotating ranges of the front and rear legs within an operating range of the link mechanism.

According to this retractable seat, the compensation mechanism may effectively function to absorb the difference between the rotating ranges of the front and rear legs when the seat is switched between the use condition and the retracted condition. Therefore, the seat can be smoothly moved between the use condition and the retracted condition, even if the link length of the front leg is different from that of the rear leg.

Other objects, features, and advantages, of the present invention will be readily understood after reading the following detailed description together with the accompanying drawings and the claims.

DETAILED DESCRIPTION OF THE INVENTION

Three detailed representative embodiments of the present teachings will now be described in further detail with reference to FIGS. 1 to 23.

First Detailed Representative Embodiment

The first detailed representative embodiment will now described with reference to FIGS. 1 to 17.

Figure 1:
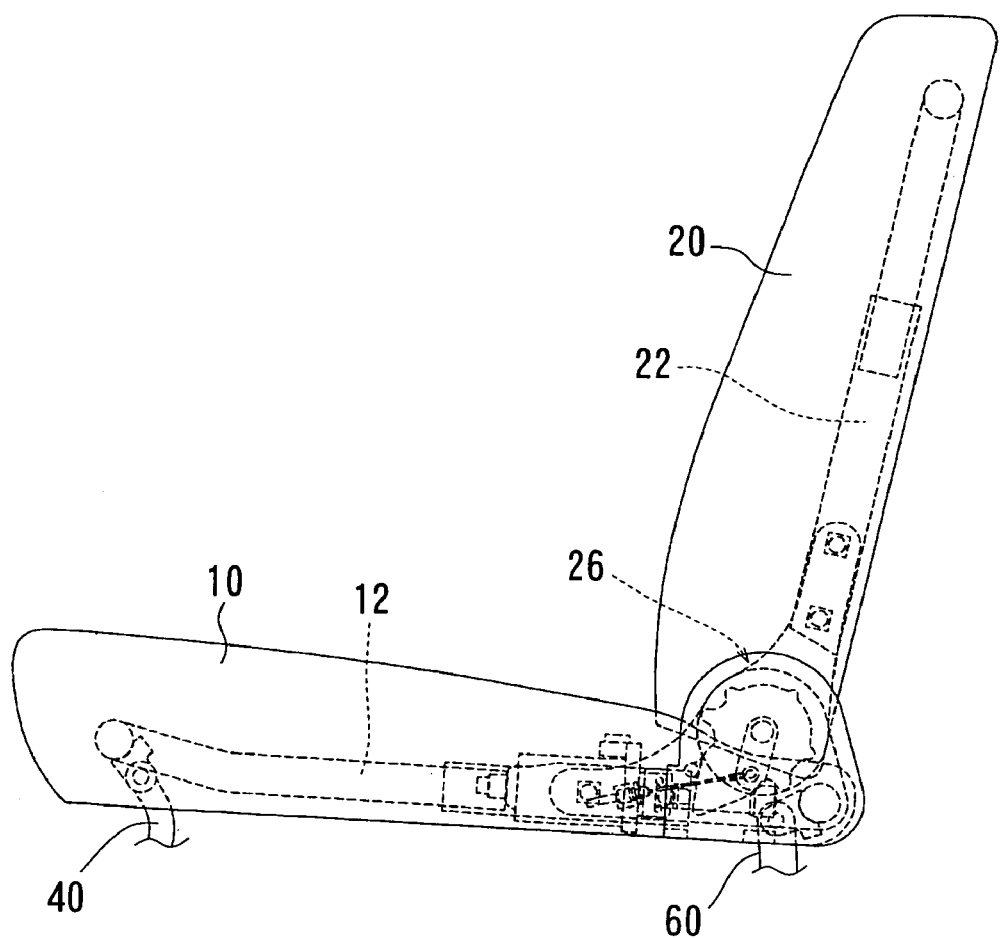
FIG. 1 is a partially omitted side view of a retractable vehicle seat according to a first embodiment of the present invention.
Figure 2:
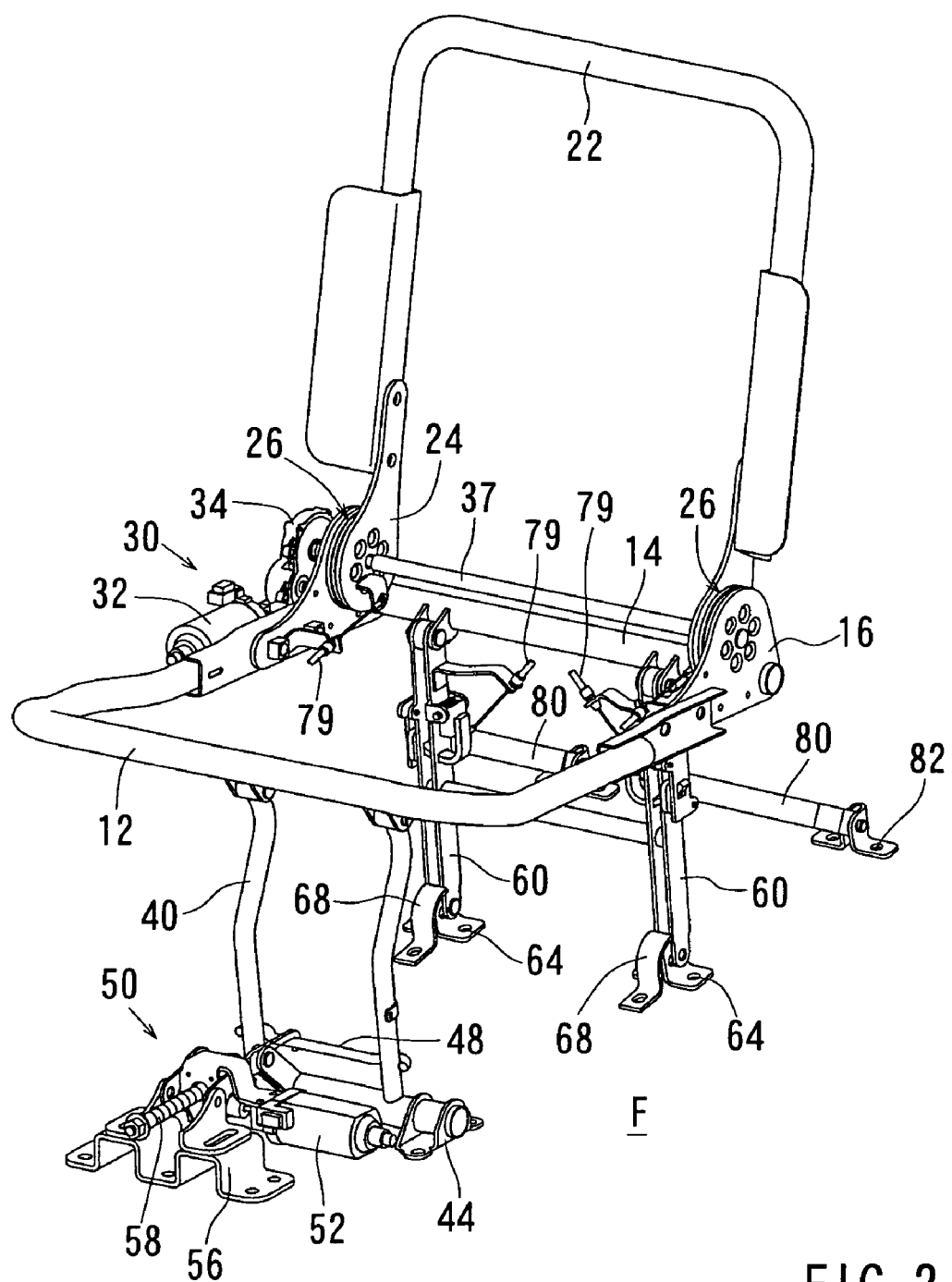
FIG. 2 is a perspective view of a frame assembly of the retractable seat.
Figure 3:
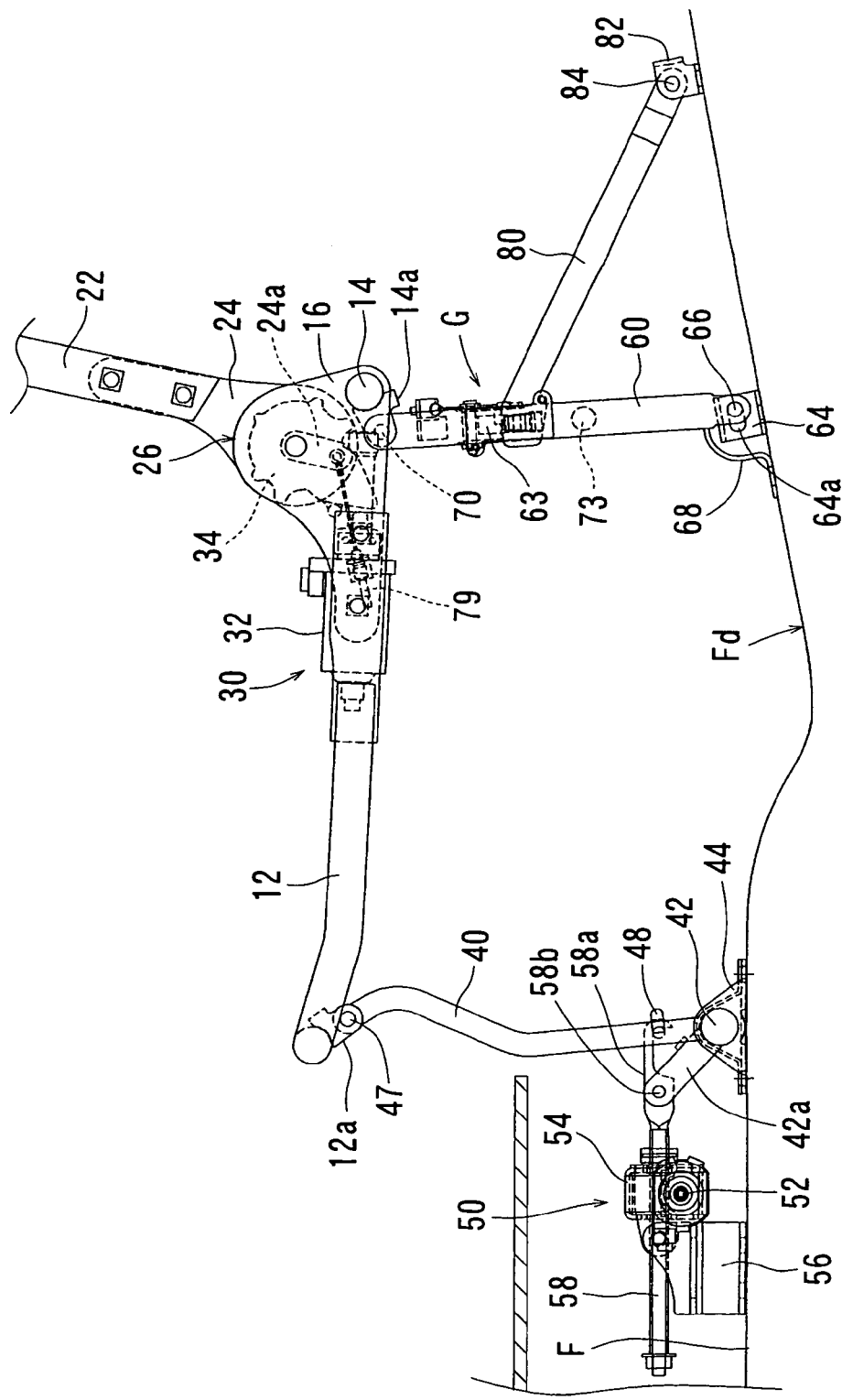
FIG. 3 is a partially side view of the frame assembly of the retractable seat.

In a retractable seat shown in FIGS. 1 to 3, it is possible to adjust the forward and backward tilting angles of a seat back 20 with respect to a seat cushion 10 by means of a reclining device 26. The reclining devices 26 can tilt the seat back 20 forwardly, superimpose the same on the seat cushion 10, and retain the seat back 20 in that condition. The seat cushion 10 is supported on a vehicle floor F via a pair of right and left front legs 40 and a pair of right and left rear legs 60 (FIGS. 2 and 3).

As shown in FIGS. 2 and 3, the reclining device 26 interconnects a cushion frame 12 of the seat cushion 10 and a back frame 22 of the seat back 20. The front legs 40 and the rear legs 60 support the cushion frame 12 on the floor F. The front legs 40 and the rear legs 60 preferably form a four-joint link mechanism together with the cushion frame 12 and the floor F. The link mechanism thus formed permits the cushion frame 12 (the seat cushion 10) to fold down onto the floor F.

Figure 4:
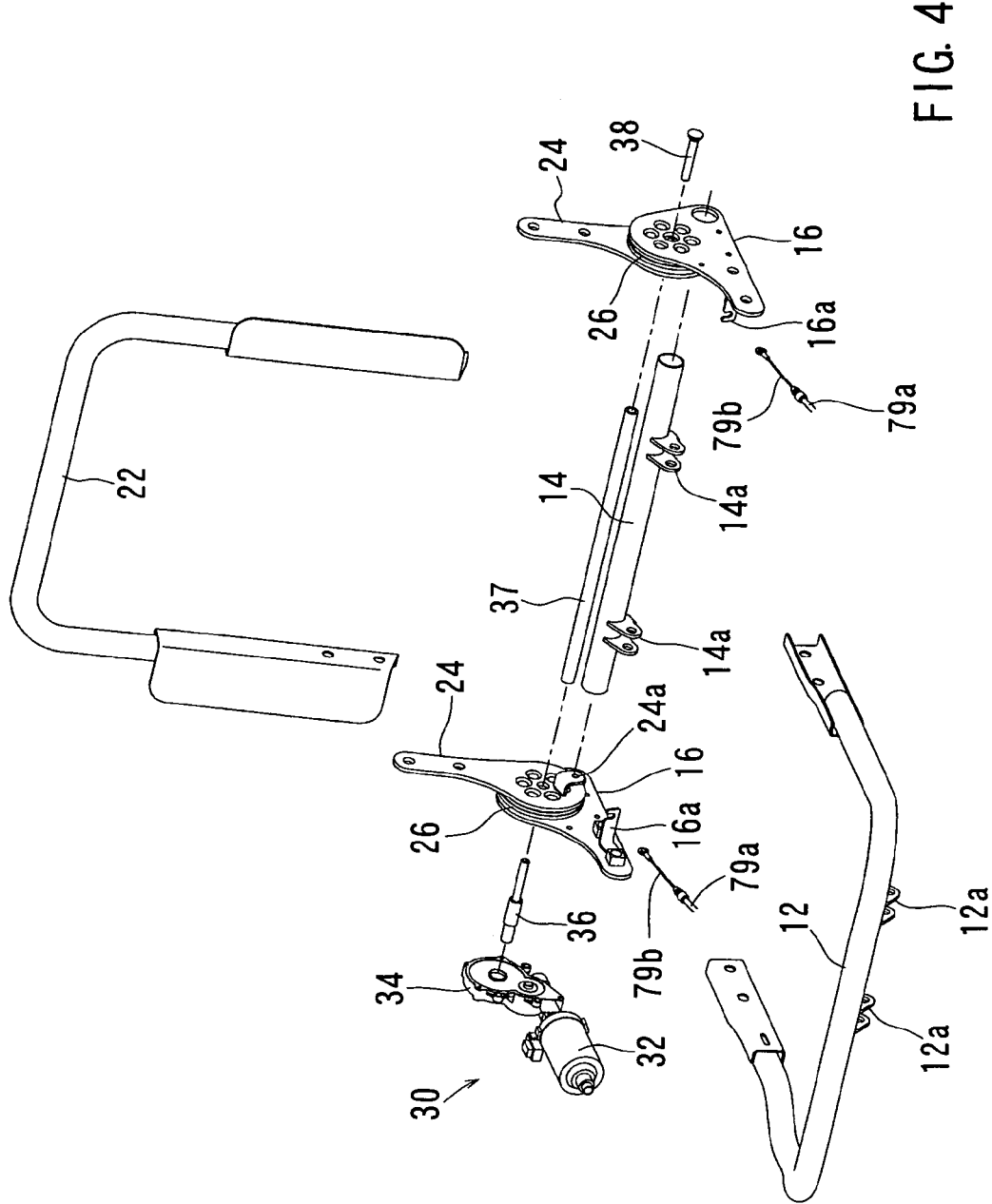
FIG. 4 is a partially exploded perspective view of the frame assembly.

As shown in FIG. 4, each of the cushion frame 12 and the back frame 22 is mainly made from a U-shaped pipe. Lower arms 16 are attached to both ends of the cushion frame 12, and upper arms 24 are attached to both ends of the back frame 22. The upper and lower arms 16 and 24 are connected together via the reclining devices 26. Further, the right and left lower arms 16 are interconnected by a reinforcing rod 14 extending therebetween.

When the seat back 20 is tilted forwardly and backwardly by the reclining devices 26, the resulting tilting motions of the seat back 20 can preferably be transmitted to two lock mechanisms G (which will be hereinafter described) via right and left individual cables 79. That is, cable brackets 16a are attached to the right and left lower arms 16, and connection brackets 24a are attached to the right and left upper arms 24. Each of the cables 79 includes an outer tube 79a and an inner cable 79b. One end of the outer tube 79a is connected to the cable bracket 16a. One end of the inner cable 79b is connected to the connection bracket 24a.

A driving means 30 for driving the reclining devices 26 is attached to one of the lower arms 16 of the cushion frame 12. The driving means 30 includes a motor 32 and a differential mechanism 34. The motor 32 can be controllably rotated in normal and reverse directions. Rotational motion of the motor 32 may preferably be transmitted to an operation shaft 36 of one of the reclining devices 26 via the differential mechanism 34, thereby rotating the operation shaft 36. The rotational motion of the operation shaft 36 is transmitted to a reclining shaft 38 of the other of the reclining devices 26 via a connecting rod 37. As a result, the driving means 30 may synchronously operate the two reclining devices 26.

Figure 5:
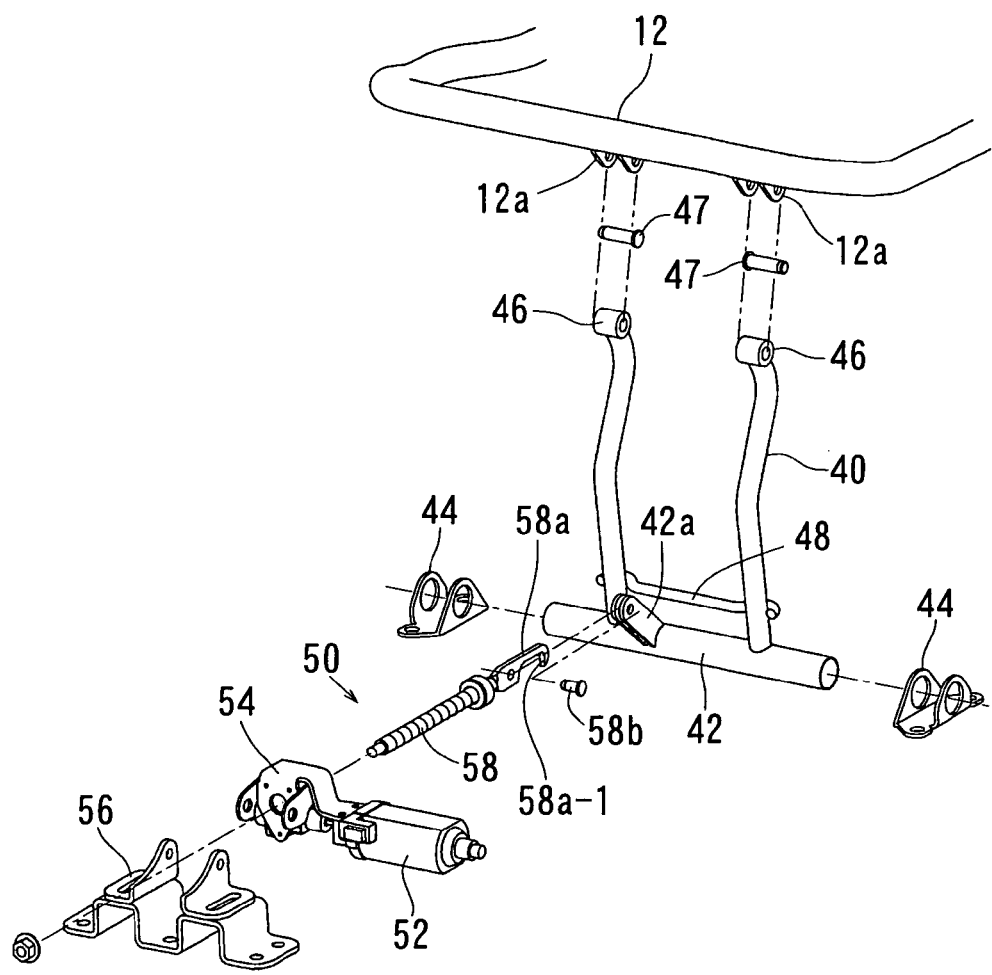
FIG. 5 is a partially exploded perspective view of the frame assembly.

As shown in FIG. 5, each of the front legs 40 is formed from a pipe. Lower ends of the front legs 40 are fixed to a lower supporting member 42. Further, upper ends of the front legs 40 are respectively provided with upper supporting portions 46. Both ends of the lower supporting member 42 are rotatably supported by a pair of bearing brackets 44 that are fixed to the floor F. The two upper supporting portions 46 are respectively rotatably connected to right and left hinge brackets 12a provided on a front lower surface of the cushion frame 12 via hinge pins 47. Thus, the front legs 40 constitute a part of the four-joint link mechanism with respect to a front portion of the cushion frame 12 and the floor F.

As shown in, for example, FIGS. 2, 3, and 5, a driving means 50, for folding down the cushion frame 12 onto the floor F or for restoring it to an original position, is positioned in front of the front legs 40. The driving means 50 includes a motor 52 and a differential mechanism 54. As best shown in FIG. 3, the motor 52 and the differential mechanism 54 are attached to a mounting bracket 56. As will be appreciated, the mounting bracket 56 may preferably be fixed to the floor F. The motor 52 can be controllably rotated in normal and reverse directions, and its rotational motion may preferably be converted to a reciprocating motion of an operating member 58 (i.e., screw rod) of the differential mechanism 54. A connection member 58a is connected to a forward end of the operating member 58. The connection member 58a is rotatably connected to a connection member or connection arm 42a via a connection pin 58b. As will be recognized, the connection arm 42a is fixed to the lower supporting member 42 of the front legs 40 and is inclined forwardly. Further, the forward end of the connection member 58a is provided with a hook 58a-1. The hook 58a-1 is positioned so as to engage and disengage an engagement member 48 that is fixed to a lower portion of the front legs 40.

Figure 6:
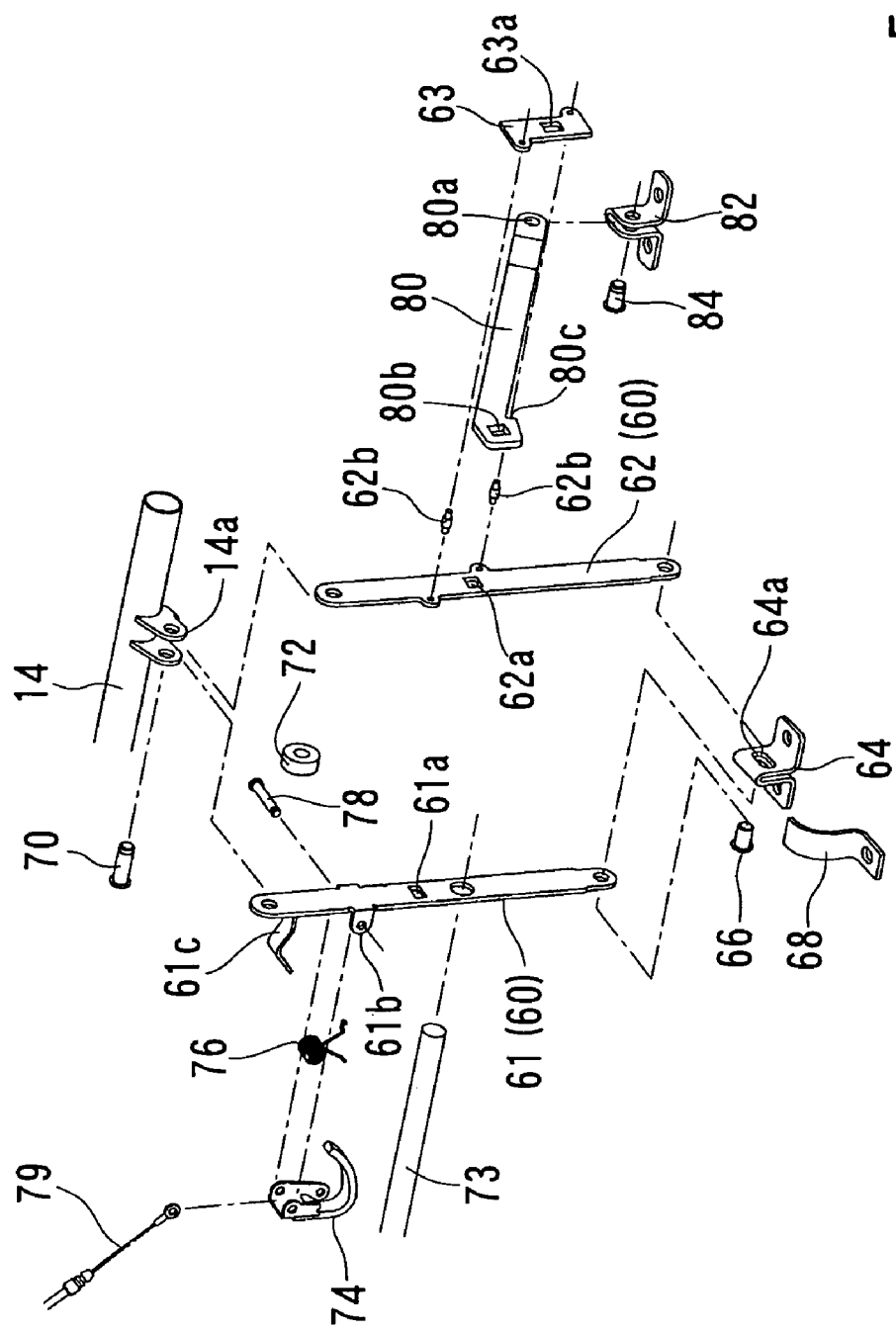
FIG. 6 is a partially exploded perspective view of the frame assembly.
Figure 7:
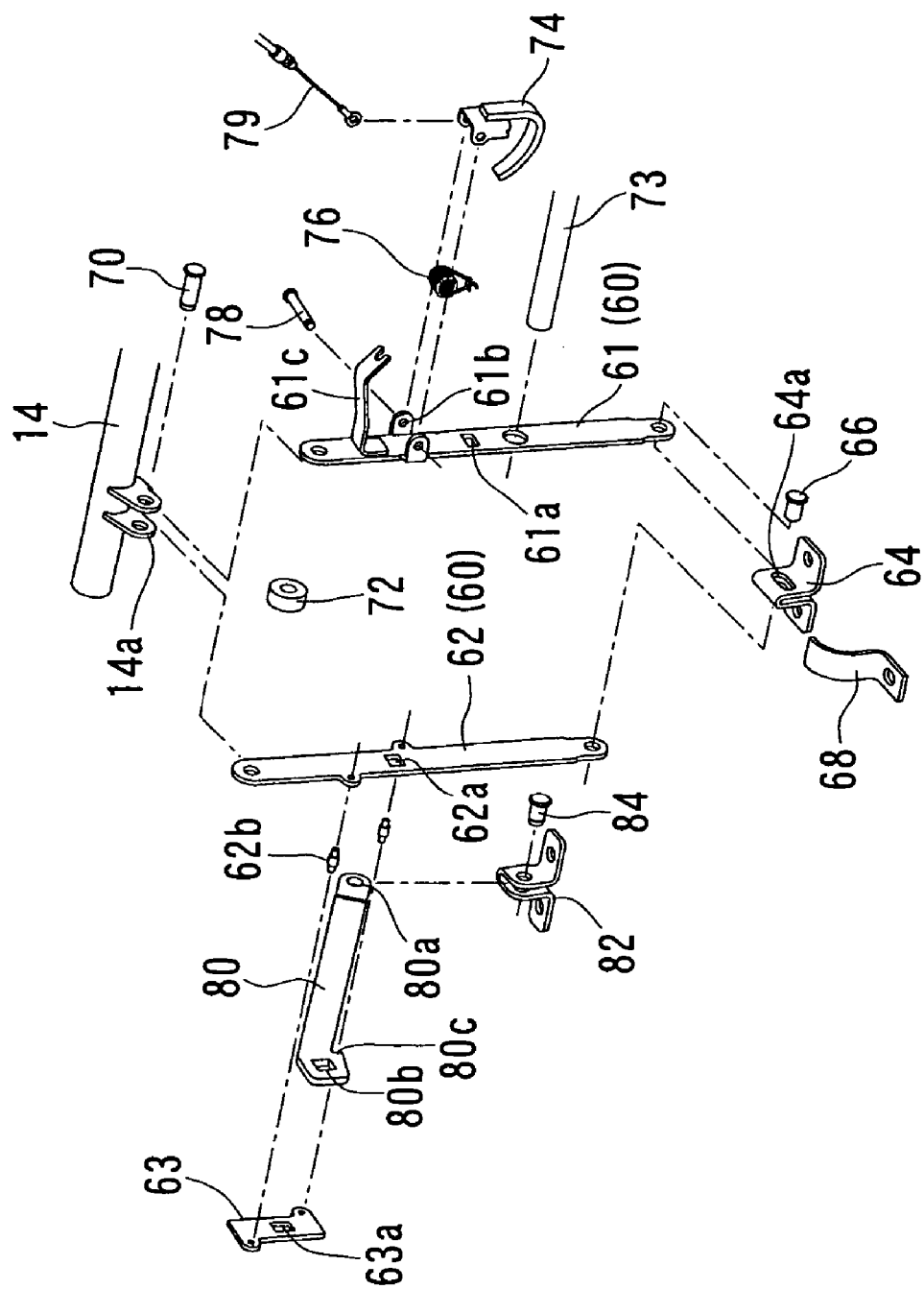
FIG. 7 is a partially exploded perspective view of the frame assembly.

As shown in FIGS. 2, 6, and 7, the rear legs 60 have the same construction and are arranged symmetrically. Each of the rear legs 60 comprises two plate members 61 and 62 (i.e., inner and outer plate members 61 and 62). Lower end portions of the two plate members 61 and 62 are positioned so as to sandwich a bearing bracket 64 fixed to the floor F, and are pivotally connected to the bearing bracket 64 via a hinge pin 66 that is inserted into an elongated hole 64a of the bearing bracket 64. That is, the hinge pin 66 is fixed to a lower end of the rear leg 60 so as to move within the elongated hole 64a in a longitudinal direction (forward and backward directions) of the seat. Thus, the hinge pin 66 and the elongated hole 64a form a movable connecting mechanism in the link mechanism. A spring member or stopper 68 (i.e., restriction mechanism) is disposed in front of the bracket 64 and is fixed to the floor F. The function of the elongated hole 64a and the stopper 68 will be hereinafter described.

Upper end portions of the two plate members 61 and 62 are connected to a hinge bracket 14a via a hinge pin 70 with a spacer 72 interleaved therebetween. As best shown in FIG. 2, the hinge bracket 14a is fixed to the reinforcing rod 14 of the cushion frame 12, and sandwiches the upper end portions of the plate members 61 and 62. Thus, the right and left rear legs 60 constitute a part of the four-joint link mechanism. In addition, the right and left rear legs 60 are interconnected by means of a reinforcing rod 73 that extends therebetween.

The plate members 61 and 62 respectively have lock holes 61a and 62a that constitute part of the lock mechanism G. The outer plate member 62 is provided with a retaining plate 63 having a lock hole 63a that constitutes a further part of the lock mechanism G. The retaining plate 63 is attached to the outer plate member 62, with interleaving a pair of upper and lower guide pins 62b therebetween. That is, a gap is formed between the plate member 62 and the retaining plate 63 by means of the guide pins 62b. A support member 80 (i.e., restraint means or support means) (which will be hereinafter described) is slidably received in the gap formed between the plate member 62 and the retaining plate 63.

Figure 8:
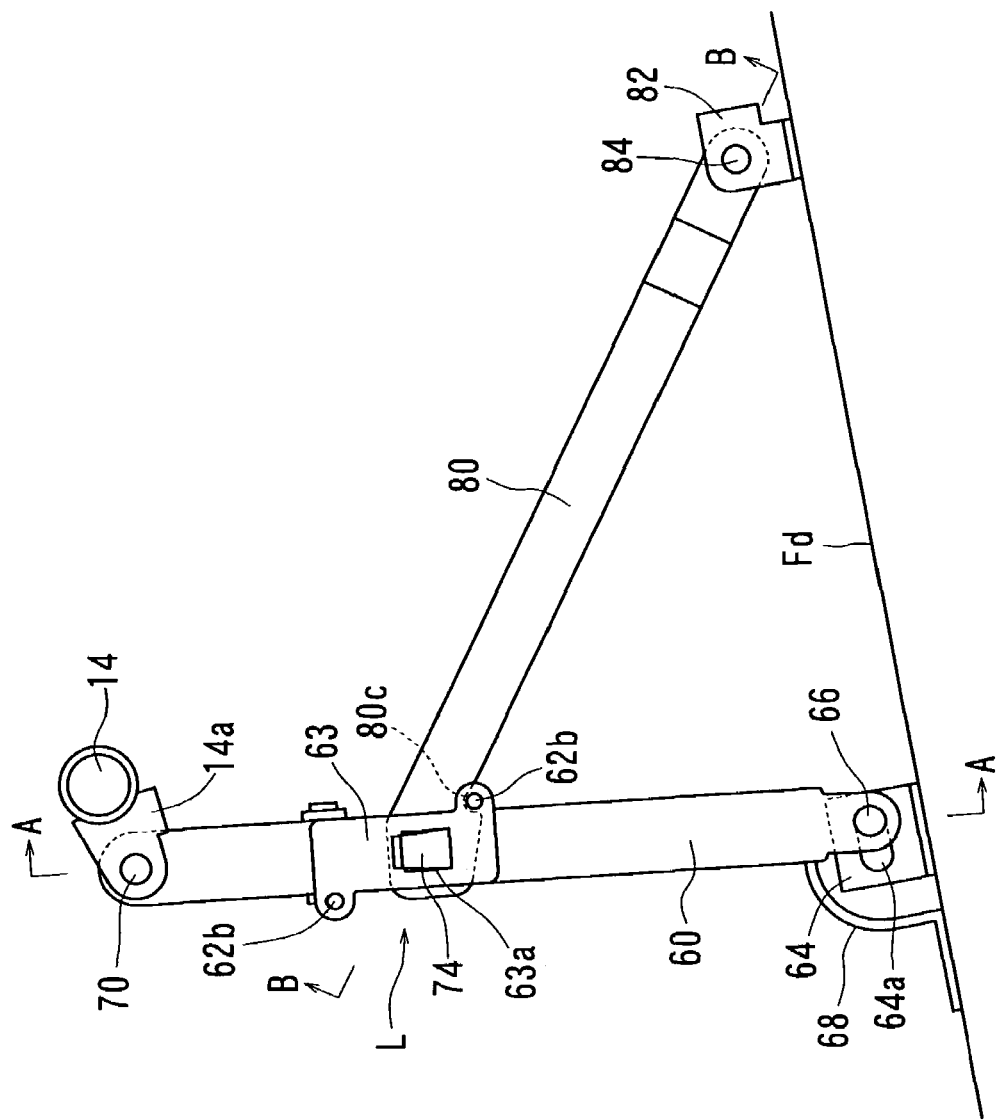
FIG. 8 is a partially side view of the frame assembly of the retractable seat.
Figure 9:
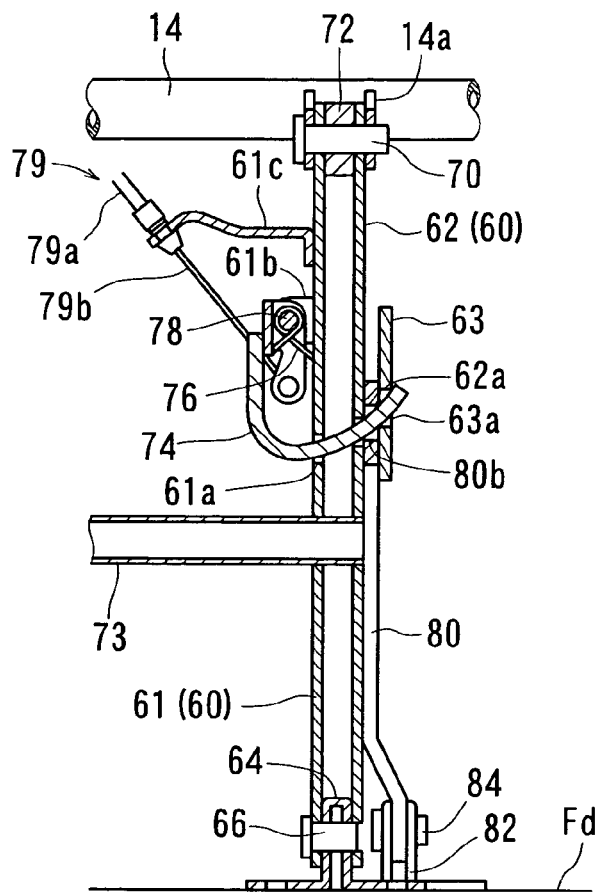
FIG. 9 is a cross-sectional view taken along line IX—IX in FIG. 8.

As shown in FIGS. 6 to 10, the inner plate member 61 is provided with a bearing bracket 61b and a cable bracket 61c. A lock member 74 that constitutes another part of the lock mechanism G is rotatably supported on the bearing bracket 61b via a hinge pin 78. The hinge pin 78 is arranged inside of the rear legs 60 so as to extend along the longitudinal direction of the seat. As best shown in FIG. 9, the lock member 74 has a hook-shape forward end portion which is constructed to enter the lock hole 63a of the retaining plate 63 through the lock holes 61a and 62a of the plate members 61 and 62. Further, the hinge pin 78 is provided with a spring 76. As will be appreciated, the spring 76 is arranged and constructed to appropriately urge the lock member 74 in a direction such that the forward end portion of the lock member 74 can be rotated to enter or engage the lock holes 61a, 62a, and 63a.

The other end of the outer tube 79a of the cable 79 is connected to the cable bracket 61c. The other end of the inner cable 79b is connected to the lock member 74. Therefore, when the inner cable 79b is pulled, the lock member 74 rotates against a force of the spring 76 so as to be retracted from the lock holes 61a, 62a, and 63a.

Each of the right and left rear legs 60 includes the support member 80 that supports the rear legs 60 from the rear sides thereof. As shown in FIGS. 6 and 7, a lower end portion of the support member 80 is formed with a shaft hole 80a. The support member 80 is supported on a bracket 82 disposed on the floor F via a hinge pin 84 that is passed through the shaft hole 80a. Further, an upper end portion of the support member 80 is formed with a lock hole 80b that constitutes a further portion of the lock mechanism G. As described above, the support member 80 is slidably received in the gap formed between the plate member 62 and the retaining plate 63 of the rear leg 60. The lock hole 80b of the support member 80 can be aligned with the lock holes 61a, 62a, and 63a, on the rear leg 60 and can receive the forward end portion of the lock member 74.

This retractable seat can be switched between a use condition shown in FIGS. 1 to 3 and a retracted condition (FIGS. 16(A) and 16(B)) by operating the four-joint link mechanism described above. The floor F is formed with a receiving recess Fd for receiving the seat (FIG. 3). Each of lower support portions (the bearing brackets 64 and the hinge pins 66) of the rear legs 60 are positioned within the receiving recess Fd. On the contrary, each of support portions (the lower supporting member 42 and the bearing brackets 44) of the front legs 40 are positioned out of the receiving recess Fd such that the seat may preferably be received within the receiving recess Fd.

Each of the front legs 40 has a link length that is defined as a length between axes of the lower supporting member 42 and the hinge pin 47. Similarly, each of the rear legs 60 has a link length that is defined as a length between axes of the hinge pin 66 and the hinge pin 70. The link length of the front leg 40 is greater than the link length of the rear leg 60. Further, in this embodiment, the receiving recess Fd has an inclined bottom surface that is gradually raised rearwardly. As will be appreciated, a tilting operation of the rear leg 60 is completed when the rear leg 60 contacts this inclined bottom surface. As a result, the rear leg 60 has a rotating range smaller than that of the front leg 40.

Because the front leg 40 and the rear leg 60 are thus designed, when the seat is switched between the use condition and the retracted condition the rotating range of the front leg 40 is greater than the rotating range of the rear leg 60 within an operating range of the link mechanism. Due to a difference between the rotating ranges of the front and rear legs 40 and 60, when the seat is switched from the use condition to the retracted condition the tilting operation of the rear leg 60 is completed before the tilting operation of the rear leg 40 is completed. Therefore, in order to compensate for the difference between the rotating ranges of the front and rear legs 40 and 60, a compensation mechanism is required. In this embodiment, the movable connecting mechanism that comprises the hinge pin 66 and the elongated hole 64a functions as the compensation mechanism.

When the seat is in the use condition shown in FIGS. 1–3, the front legs 40 and the rear legs 60 stand up substantially vertically so that the cushion frame 12 is substantially horizontally supported. At this time, each of the lower end portions of the rear legs 60 contacts the stopper 68 and is pushed backwardly. As a result, the hinge pins 66 are positioned in rearmost positions in the elongated holes 64a of the bearing brackets 64 (FIG. 8). That is, a connecting portion of the floor F and the rear leg 60 (i.e., the elongated hole 64a and the hinge pin 66) are unrotatably locked by means of the stopper 68. Further, because the lower end of the rear leg 60 is elastically forced or pushed by the stopper 68, the hinge pins 66 can be reliably positioned in desired positions in the elongated holes 64a if a relative position between the rear leg 60 and the bearing bracket 64 is varied when assembled.

Figure 10:
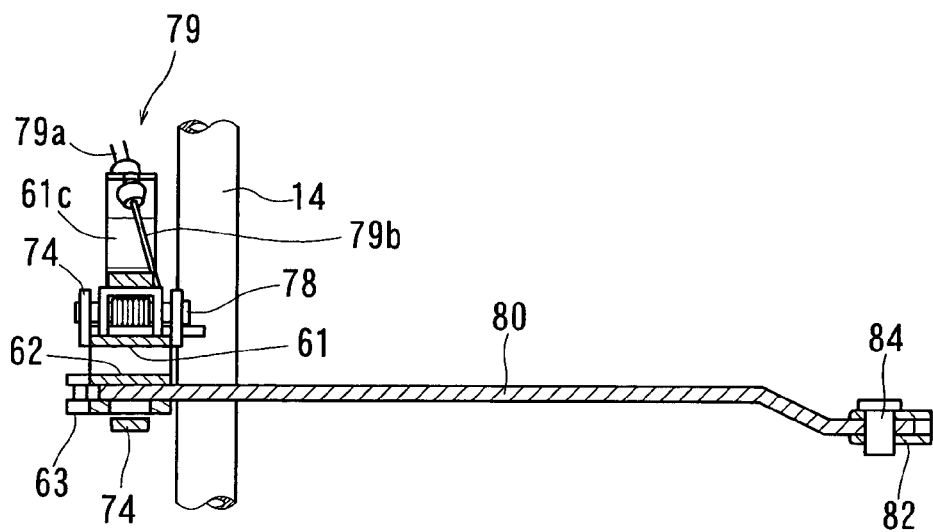
FIG. 10 is a cross-sectional view taken along line X—X in FIG. 8.
Figure 11:
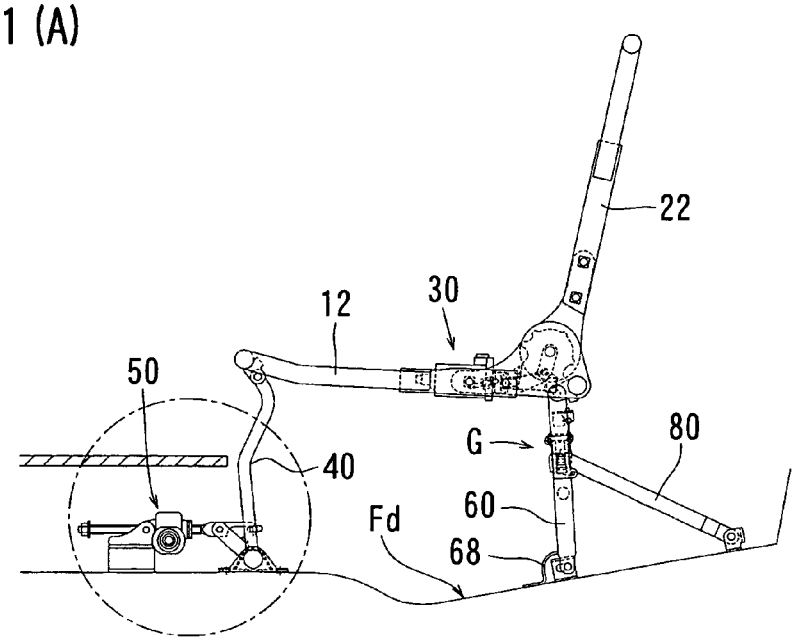
FIG. 11(A) is a side view of the frame assembly, illustrating a condition in which the seat is in a use condition.
FIG. 11(B) is an enlarged view of a encircled portion of FIG. 11(A)
Figure 11:
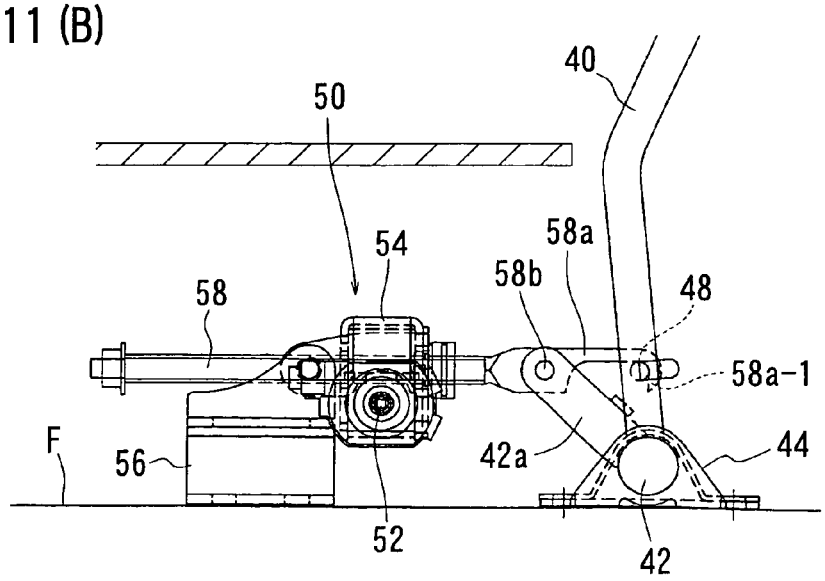
Figure 12:
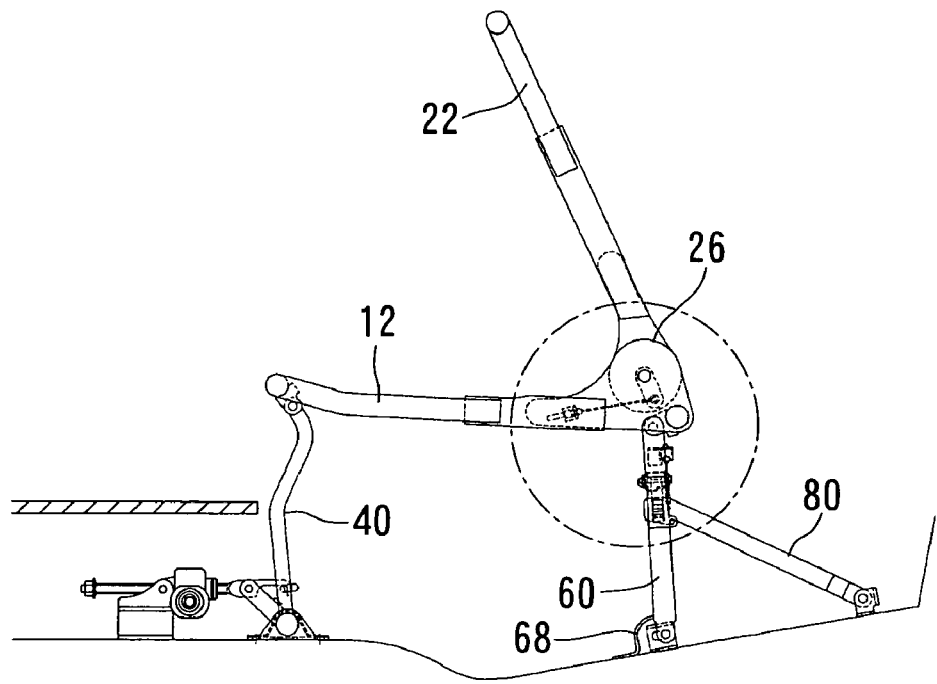
FIG. 12(A) is a side view of the frame assembly, illustrating a condition in which a seat back is started to be tilted forwardly.
FIG. 12(B) is an enlarged view of a encircled portion of FIG. 12(A)
Figure 12:
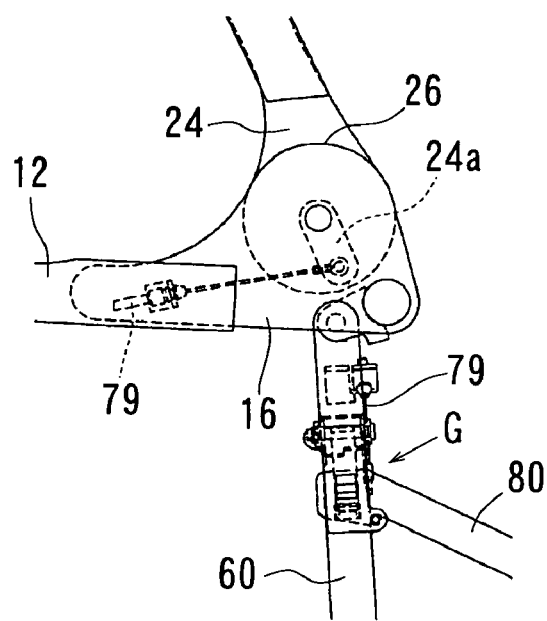
Figure 13:
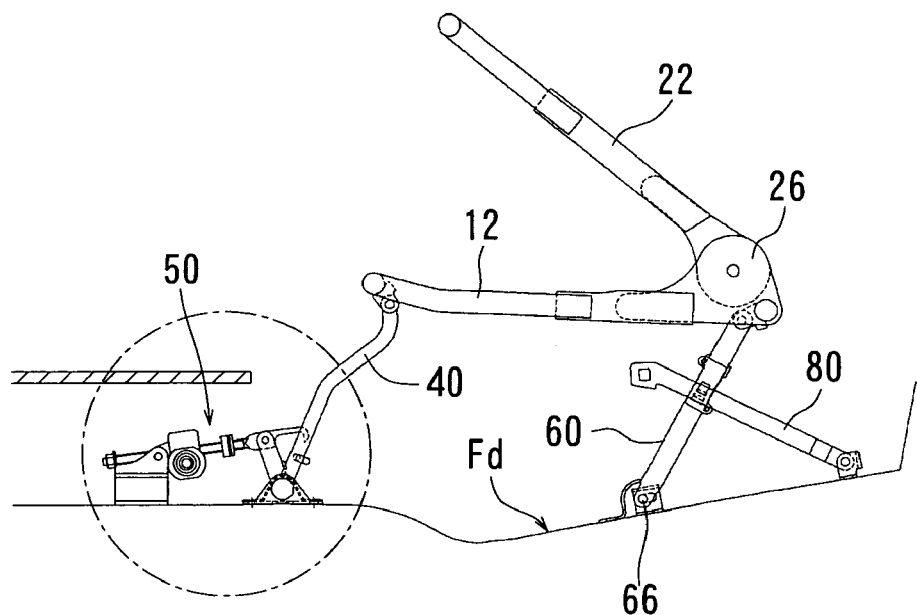
FIG. 13(A) is a side view of the frame assembly, illustrating a condition in which the seat back is further tilted forwardly (i.e., an initial or first intermediate condition of the seat)
FIG. 13(B) is an enlarged view of a encircled portion of FIG. 13(A)
Figure 13:
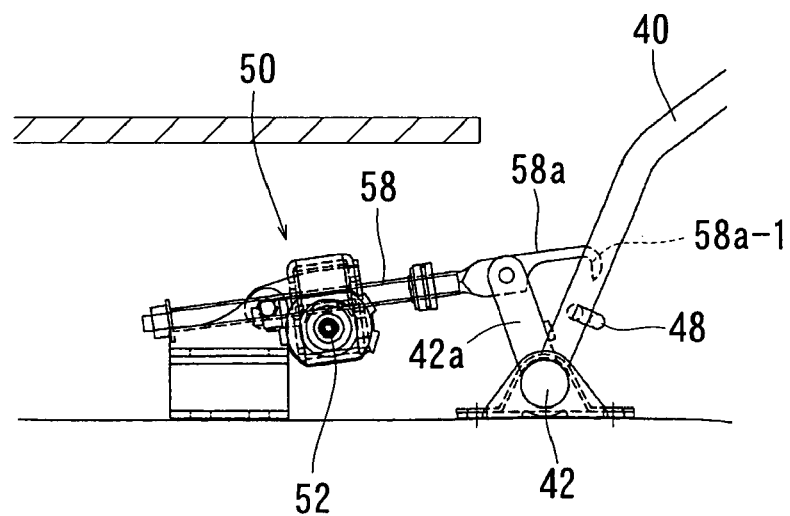
Figure 14:
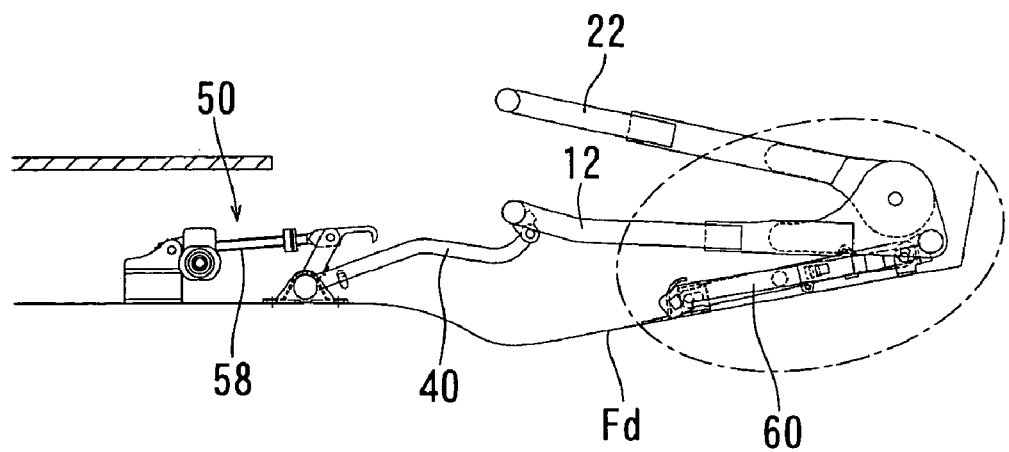
FIG. 14(A) is a side view of the frame assembly, illustrating a condition in which the seat back is further tilted forwardly (i.e., a second intermediate condition of the seat)
FIG. 14(B) is an enlarged view of a encircled portion of FIG. 14(A)
Figure 14:
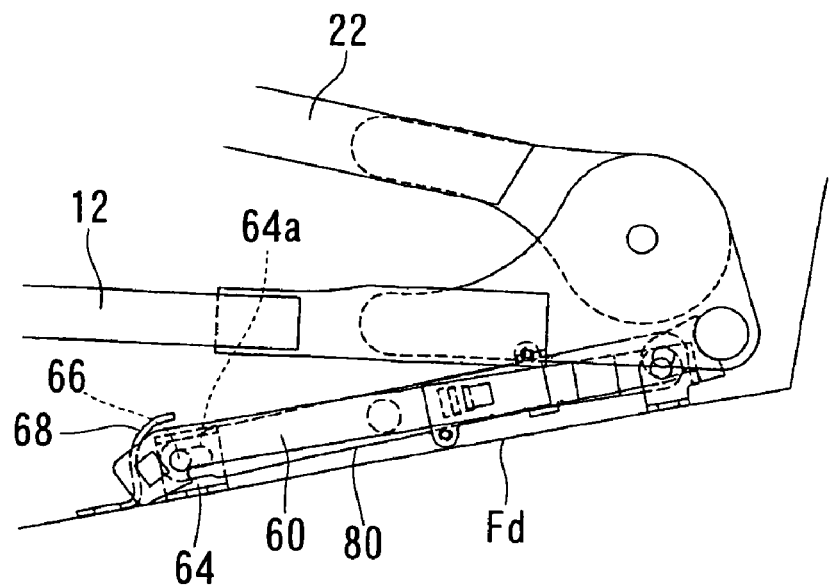
Figure 15:
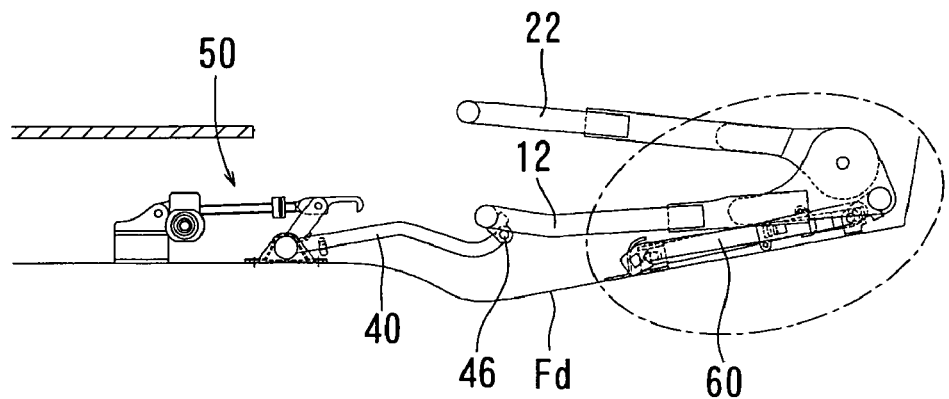
FIG. 15(A) is a side view of the frame assembly, illustrating a condition in which the seat back is further tilted forwardly (i.e., a third intermediate condition of the seat)
FIG. 15(B) is an enlarged view of a encircled portion of FIG. 15(A)
Figure 15:
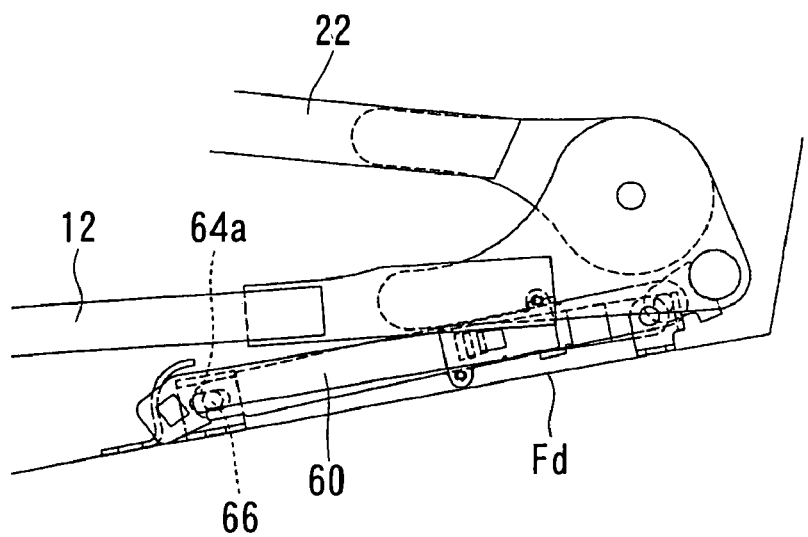
Figure 16:
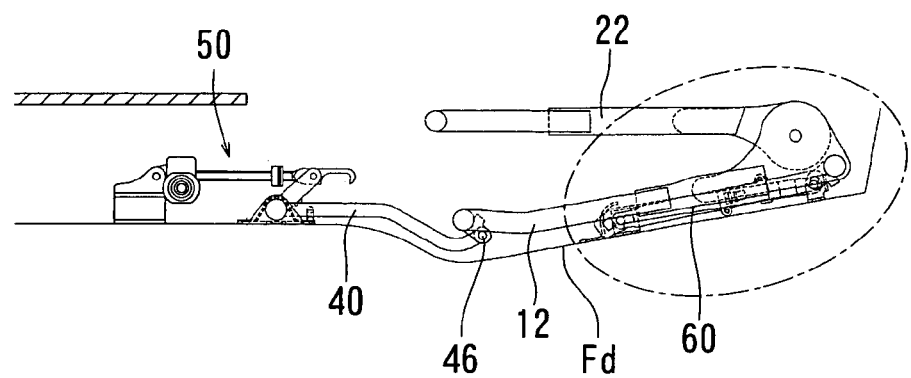
FIG. 16(A) is a side view of the frame assembly, illustrating a condition in which the seat is in a retracted condition.
FIG. 16(B) is an enlarged view of a encircled portion of FIG. 16(A)
Figure 16:
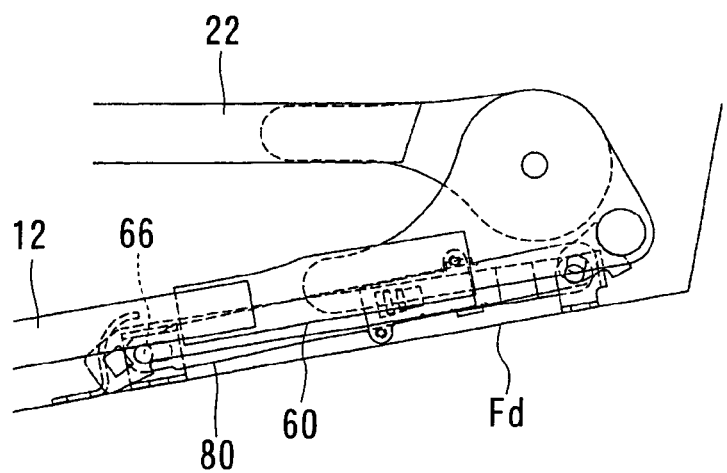

When the seat is in the use condition, the upper end portion of each of the support members 80 is positioned in the gap formed between the plate member 62 and the retaining plate 63 of the rear leg 60 (FIGS. 8 and 10). In this condition, a lock portion 80c formed on the lower surface of the upper end portion of the support member 80 engages the lower guide pin 62b (FIG. 8). As a result, the lock hole 80b of the support member 80 may preferably be positioned so as to align with the lock holes 61a, 62a, and 63a, of the rear leg 60. The lock holes 61a, 62a, 63a, and 80b, thus aligned with each other, receive the hook-shape forward end portion of the lock member 74 (FIG. 9). That is, a condition in which the lock hole 80b is aligned with the lock holes 61a, 62a, and 63a, on the rear leg 60 means a condition in which the hook-shape forward end portion of the lock member 74 can be introduced thereinto (FIG. 9).

The lock member 74 is urged counterclockwise in FIG. 9, around the hinge pin 78, by means of the spring 76. Therefore, the forward end portion of the lock member 74 passes through the lock holes 61a and 62a of the plate members 61 and 62 and the lock hole 80b of the support member 80 and extends into the lock hole 63a of the retaining plate 63. Thus, the upper end portion of the support member 80 and the rear leg 60 may preferably be interconnected. That is, the lock mechanism G may preferably interconnect the upper end portion of the support member 80 and the rear leg 60 and maintain a condition in which they are interconnected. In this condition, the support member 80 supports the rear leg 60 on the floor F from the rear side thereof.

As described above, when the inner cable 79b of the cable 79 is pulled the lock member 74 rotates clockwise in FIG. 9 against the force of the spring so that the hook-shape forward end portion of the lock member 74 is pulled out of the lock holes 61a, 62a, and 63a, of the rear leg 60 and the lock hole 80b of the support member 80. As a result, the connection between the upper end portion of the support member 80 and the rear leg 60 is canceled.

Next, an operation for switching the seat from the use condition to the retracted condition will be described with reference to, in particular, FIGS. 11(A) to 16(B). Further, it is noted that the motion of the cushion frame 12 and the back frame 22 is substituted for the motion of the seat cushion 10 and the seat back 20.

When the seat is in the use condition shown in FIG. 11(A) and 11(B), the operating member 58, of the driving means 50 that may tilt the front legs 40, is most retracted as shown in FIG. 11(B) or FIGS. 2 and 3. As a result, the connection pin 58b that connects the connection member 58a and the connection arm 42a is positioned on a forwardmost position (a leftmost position in the drawing). Further, the hook 58a-1 of the forward end of the connection member 58a engages the engagement member 48 at a backward position of the connection pin 58b (a right side in the drawing). Further, when the seat is in the use condition as previously described, the upper end portion of the support member 80 is connected to the rear leg 60 by means of the lock mechanism G. As a result, the rear legs 60 are supported on the floor F from the rear side thereof by means of the support member 80.

In the use condition shown in FIGS. 11(A) and 11(B), when a switch for a seat retracting operation (not shown) is operated, the motor 32 of the driving means 30 is first actuated. When the motor 32 is actuated, the reclining devices 26 are driven so that the back frame 22 (seat tack 20) begins to tilt forwardly as shown in FIG. 12(A). When the back frame 22 is tilted, the connection brackets 24a of the upper arms 24 rotate around axes of the reclining devices 26 so that the right and left inner cables 79b are pulled. When the back frame 22 is tilted to a condition shown in FIGS. 12(A) and 12(B), the connection (lock) is canceled between the support members 80 and the rear legs 60 due to the right and left lock mechanisms G.

After the connection between the support members 80 and the rear legs 60 by the lock mechanisms G has been canceled, the motor 52 of the driving means 50 is driven. When the motor 52 is driven, the operating member 58 is pushed out from the differential mechanism 54 so that the lower supporting member 42 of the front legs 40 is rotated around its axis via the connection member 58a and the connection arm 42a. As a result, the front legs 40 are tilted backwardly, as shown in FIGS. 13(A) and 13(B). As best shown in FIG. 13(B), after the operating member 58 starts to be pushed out, the hook 58a-1 of the connection member 58a is disengaged from the engagement member 48 of the front legs 40, thereby allowing the front legs 40 to tilt.

When the front legs 40 are tilted backwardly, the four-joint link mechanism including the front legs 40 is operated. As a result, the cushion frame 12 is lowered toward the floor F, and the rear legs 60 are also tilted backwardly. At this time, as shown in FIG. 13(A), the support members 80 fall down toward the floor F while sliding relative to the rear legs 60. Further, in synchronism with operations of the link mechanism (which is constituted of the front legs 40, the rear legs 60, the cushion frame 12 and the floor F) and the support members 80, the back frame 22 is continuously tilted.

In the condition shown in FIGS. 14(A) and 14(B), the tilting operation of the rear legs 60 and the support members 80 is completed so that the rear legs 60 and the support members 80 fall down onto the floor F. Further, a tilting operation of the back frame 22 is also completed, and the motor 32 of the driving means 30 is stopped. However, a tilting operation of the front legs 40 is not yet completed, and a front side of the seat (the cushion frame 12) has not completely fallen down. This is because, as previously described, there is the difference between the rotating ranges of the front and rear legs 40 and 60 within the operating range of the link mechanism. Further, as will be apparent from FIG. 14(B), after the rear legs 60 start to be inclined (FIG. 13(A)), each of the lower hinge pins 66 is positioned in a forwardmost position within the elongated hole 64a of the bearing bracket 64.

Thus, in the condition shown in FIGS. 14(A) and 14(B), due to the difference between the rotating ranges of the front and rear legs 40 and 60, the tilting operation of only the rear legs 60 has been completed. Therefore, in order to further fold down the front legs 40, it is necessary to compensate for such a difference. In order to compensate for the difference, the cushion frame 12 is shifted backwardly. That is, as shown in FIG. 15(A), when the front legs 40 are further tilted, as shown in FIG. 15(B), the hinge pins 66 of the rear legs 60 move backwardly (rightwardly in the drawings) within the elongated holes 64a. Due to the movement of the hinge pins 66, as shown in FIG. 16(A), the front legs 40, having a rotating range greater than that of the rear legs 60, can completely fall down. As a result, the cushion frame 12 (the seat) has fallen down so as to be substantially parallel to the bottom surface of the receiving recess Fd, so that the seat becomes positioned in a retracted condition.

At this time, the positions of the upper supporting portions 46 (hinge pins 47) of the front legs 40 have been displaced forwardly compared to their positions as shown in FIG. 15(A). Therefore, as shown in FIG. 16(B), the hinge pins 66 of the rear legs 60 are brought back to the forwardmost positions within the elongated holes 64a. In the condition shown in FIGS. 16(A) and 16(B), the motor 52 of the driving means 50 is stopped. Thus, because the driving means 30 and 50 are stopped, the seat may preferably be maintained in the retracted condition.

In order to switch the seat from the retracted condition shown in FIGS. 16(A) and 16(B), to the use condition shown in FIGS. 11(A) and 11(B), a switch (not shown) is operated such that the motors 32 and 52 of the driving means 30 and 50 are reversely actuated. As a result of the driving means 50 being driven, the front legs 40 are rotated in a direction such that the front legs 40 rise up. At this time, each of the hinge pins 66 (i.e., the compensation mechanism) within each of the elongated holes 64a returns to a position shown in FIG. 14(B) from a position shown in FIG. 16(B) via a position shown in FIG. 15(B). Thereafter, as shown in FIGS. 13(A) and 13(B), the front legs 40 and the rear legs 60 (including the support members 80) rotate together so that the cushion frame 12 is lifted up from the receiving recess Fd. Further, as a result of the driving means 30 being driven, the back frame 22 begins to tilt up rearwardly. As will be appreciated, during these operations, the hinge pins 66 may preferably be retained in the position shown in FIG. 14(B) (i.e., the forwardmost position within the elongated holes 64a).

When the seat is returned to the condition shown in FIGS. 12(A) and 12(B), the lower end portions of the rear legs 60 contact the stoppers 68 and are pushed backwardly. As a result, the hinge pins 66 are positioned in the rearmost positions in the elongated holes 64a of the bearing brackets 64 (FIGS. 3 and 8). This position of the hinge pins 66 is maintained until the rear legs 60 are tilted backwardly again. Further, when the seat is in this condition, the lock portion 80c of each of the support members 80 engages the guide pin 62b, and the lock holes 61a, 62a, and 63a, of the rear legs 60 are aligned with the lock hole 80b of the support member 80. Thereafter, when the back frame 22 rotates to the position as shown in FIGS. 11(A) and 11(B), the pulling force applied on the right and left inner cables 79b is canceled. As a result, the support members 80 and the rear legs 60 are connected (locked) together again by the right and left lock mechanisms G so that the seat is returned to the use condition.

In the condition shown in FIGS. 11(A) and 11(B), the motors 32 and 52 of the driving means 30 and 50 are respectively stopped. Further, the hook 58a-1 of the connection member 58a of the driving means 50 engages the engagement member 48 of the front legs 40 again during a transition between the condition shown in FIGS. 13(A) and 13(B) and the condition shown in FIGS. 12(A) and 12(B). When the seat is in the use condition, one end portion of each of the support members 80 is connected to each of the right and left rear legs 60 by means of the lock mechanism G. The connecting position substantially corresponds to an intermediate position between the upper and lower support points (hinge pins 70 and 66) of each of the right and left rear legs 60. As a result, the retractable seat thus constructed may preferably have an increased support strength in the use condition. Thus, the seat can be reliably supported even when an excessive load is applied thereto.

As will be apparent from the above description, the compensation mechanism that comprises the hinge pin 66 and the elongated hole 64a may effectively compensate for the difference between the rotating ranges of the front and rear legs 40 and 60 within the operating range of the four-joint link mechanism. As a result, for example, when the seat is switched from the use condition to the retracted condition, rotational motion of the front leg 40, having the rotating range greater than the rear leg 60, is effectively prevented from being immobilized during rotation. Therefore, the seat can be sufficiently received within the receiving recess Fd in the retracted condition so as to be substantially flush with the floor F. In addition, in the use condition of the seat, as previously described, the hinge pins 66 are positioned in the rearmost positions in the elongated holes 64a by means of the stoppers 68 (i.e., restriction mechanism). Therefore, in the use condition of the seat, the link mechanism can be reliably retained.

Second Detailed Representative Embodiment

The second detailed representative embodiment will now described with reference to FIGS. 17–20.

Because the second embodiment relates to the first embodiment, only constructions and elements that are different from the first embodiment will be explained in detail. Elements that are the same in the first and second embodiments will be identified by the same reference numerals and detailed description of such elements may be omitted.

Figure 17:
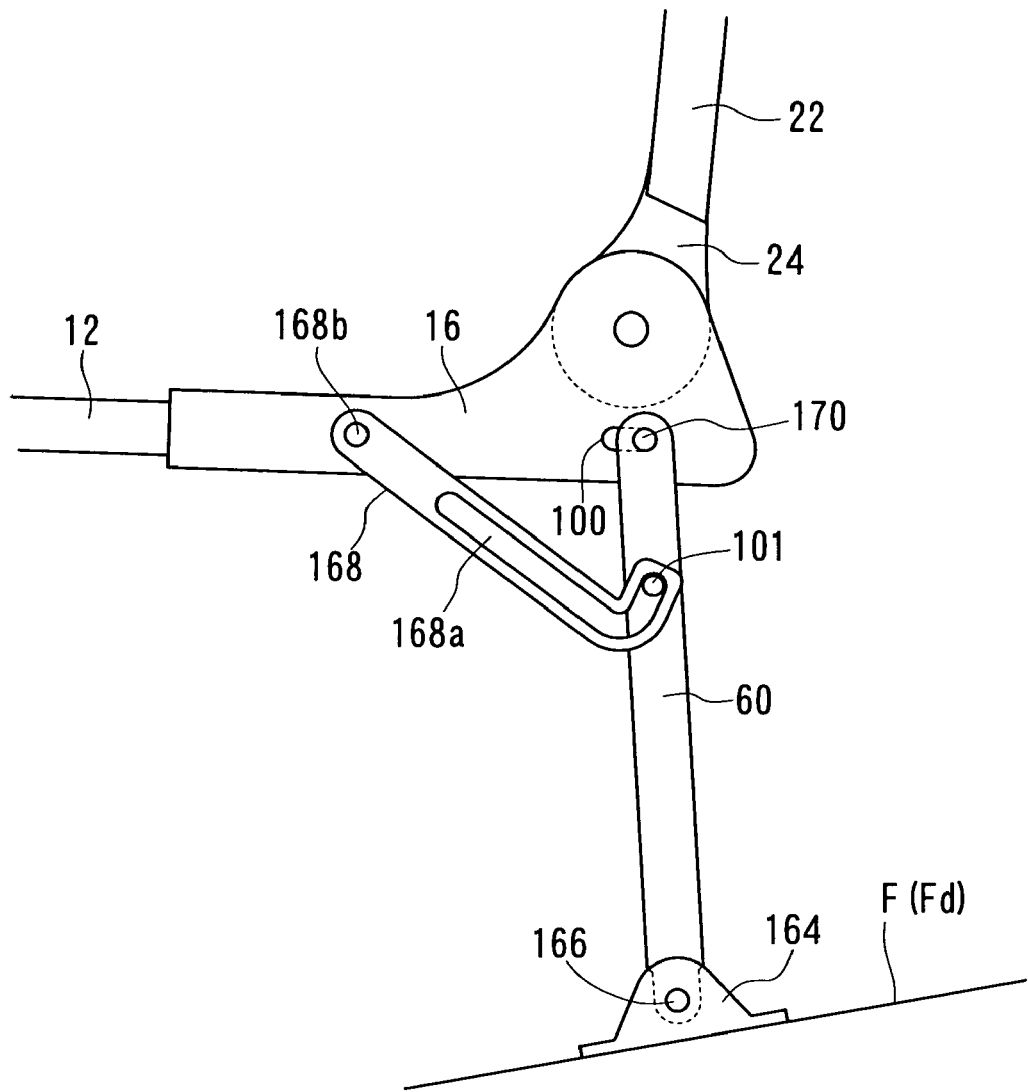
FIG. 17 is a partially side view of a frame assembly of a retractable seat according to a second embodiment of the present invention, illustrating a condition in which the seat is in a use condition.

As shown in FIG. 17, in this embodiment, a compensation mechanism is provided between the cushion frame 12 and the rear leg 60. A lower end of the rear leg 60 is pivotally connected to a bearing bracket 164 fixed to the floor F via a hinge pin 166. On the other hand, an upper end of the rear leg 60 is provided with a hinge pin 170. The hinge pin 170 engages the elongated hole 100 that is formed in the lower arm 16, so as to move therealong in a longitudinal direction (forward and backward directions) of the seat. Thus, the hinge pin 170 and the elongated hole 100 form a movable connecting mechanism in the link mechanism, which functions as the compensation mechanism. In addition, the rear leg 60 is provided with a restriction lever 168 (i.e., restriction mechanism). One end of the restriction lever 168 is rotatably connected to the lower arm 16 via a pin 168b. The other end of the restriction lever 168 has an L-shaped configuration and is formed with an L-shaped guide slot 168a. The guide slot 168a engages a guide pin 101 provided on the rear leg 60. That is, the other end of the restriction lever 168 movably engages the rear leg 60.

The restriction lever 168 is preferably provided with biasing means such as a spring (not shown), so as to be retained in a condition shown in FIG. 17 when the seat is in the use condition. In this condition, a connecting portion of the cushion frame 12 and the rear leg 60 (i.e., the elongated hole 100 and the hinge pin 170) are unrotatably locked by means of the restriction lever 168. Further, the hinge pin 170 is positioned in a rearmost position within the elongated hole 100.

Figure 18:
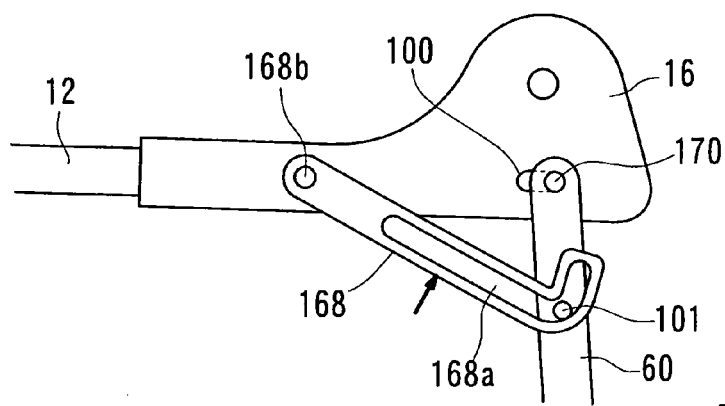
FIG. 18 is a partially side view of the frame assembly, illustrating a condition in which a seat back is started to be tilted forwardly.
Figure 19:
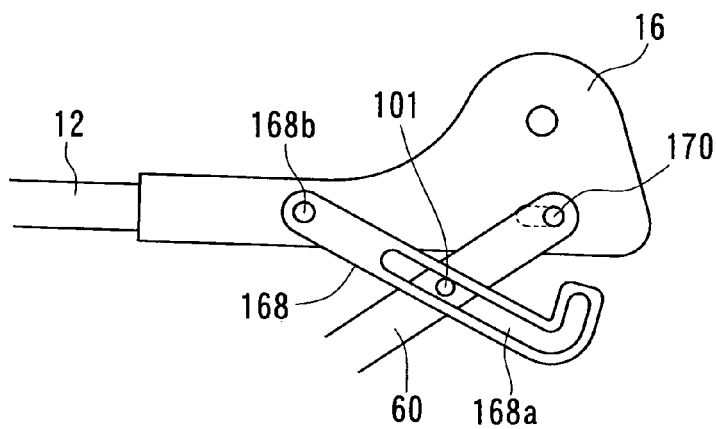
FIG. 19 is a partially side view of the frame assembly, illustrating a condition in which the seat back is further tilted forwardly.
Figure 20:
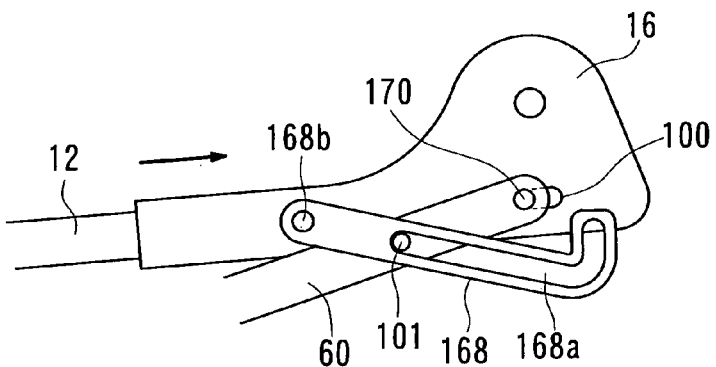
FIG. 20 is a partially side view of the frame assembly, illustrating a condition in which the seat back is further tilted forwardly.

When the link mechanism is operated in order to switch the seat from the use condition to the retracted condition, the restriction lever 168 is rotated to a condition shown in FIG. 18 so that the connecting portion of the cushion frame 12 and the rear leg 60 is unlocked. As a result, as shown in FIG. 19, the rear leg 60 begins to be tilted rearwardly so that the cushion frame 12 is lowered toward the floor F. At this time, the guide pin 101 moves along the guide slot 168a and the front leg 40 rotates relative to the cushion frame 12 around their connecting portion. When the front leg 40 is further rotated or tilted, the hinge pin 170 moves fowardly (leftwardly in the drawings) within the elongated hole 100 so that the cushion frame 12 is moved rearwardly. Thus, the compensation mechanism that comprises the hinge pin 170 and the elongated hole 100 may effectively compensate for a difference between a rotating range of the front and rear legs 40 and 60. As a result, for example, when the seat is switched from the use condition to the retracted condition, rotational motion of the front leg 40 having the rotating range greater than the rear leg 60 is effectively prevented from being immobilized during rotation.

Third Detailed Representative Embodiment

The third detailed representative embodiment will now described with reference to FIGS. 21 to 23.

Because the third embodiment relates to the first and second embodiments, only constructions and elements that are different from the first and second embodiments will be explained in detail. Elements that are the same in the first to third embodiments will be identified by the same reference numerals and detailed description of such elements may be omitted.

Figure 21:
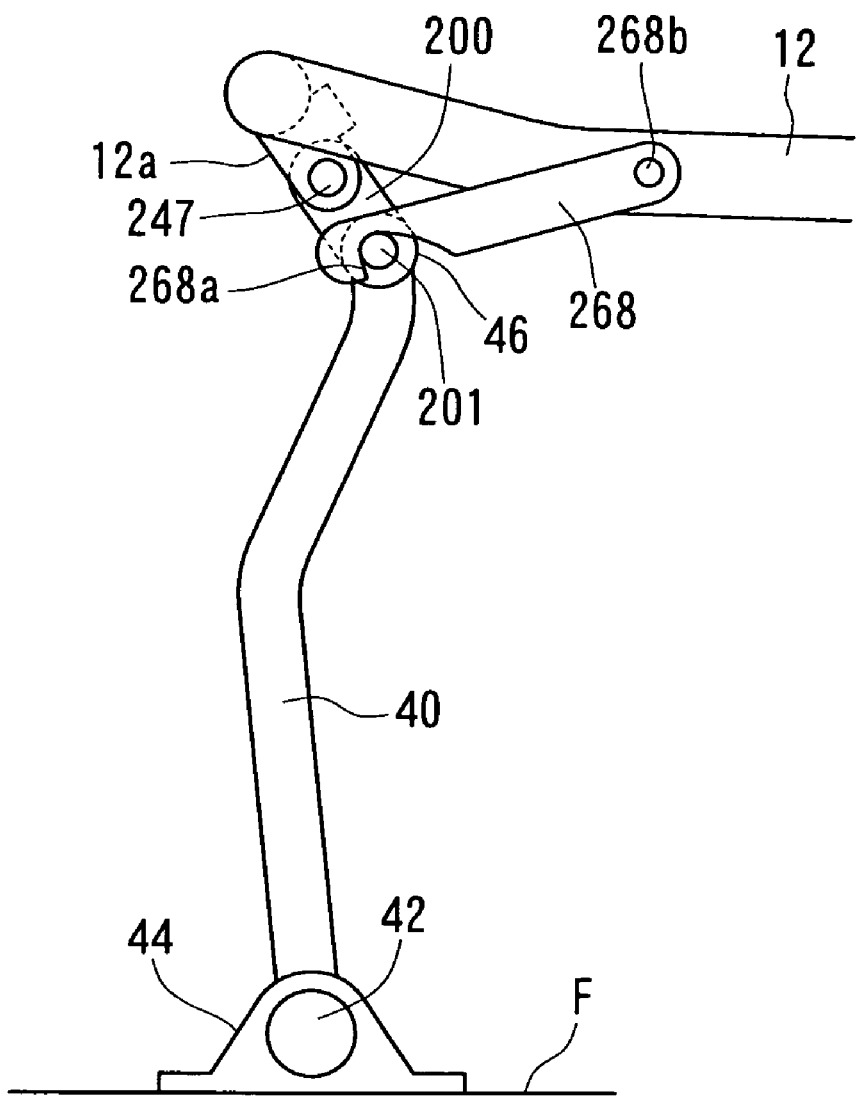
FIG. 21 is a partially side view of a frame assembly of a retractable seat according to a third embodiment of the present invention, illustrating a condition in which the seat is in a use condition.

As shown in FIG. 21, in this embodiment, a compensation mechanism is provided between the cushion frame 12 and the front leg 40. A link member 200 is provided between the upper supporting portion 46 of the front leg 40 and the hinge bracket 12a of the cushion frame 12. One end of the link member 200 is pivotally connected to the hinge bracket 12a via a hinge pin 247. The other end of the link member 200 is pivotally connected to the upper supporting portion 46 via a pin 201. Thus, the link member 200 forms a movable connecting mechanism in the link mechanism, which functions as the compensation mechanism. Further, the front leg 40 is provided with a restriction lever 268 (i.e., restriction mechanism). One end of the restriction lever 268 is formed with a hook portion 268a. The other end of the restriction lever 268 is rotatably connected to the cushion frame 12 via a pin 268b.

When the seat is in the use condition, as shown in FIG. 21, the hook portion 268a of the restriction lever 268 engages the pin 201. Therefore, in this condition, a connecting portion of the front leg 40 and the cushion frame 12 (i.e., the link member 200) is unrotatably locked by means of the restriction lever 268, so as not to rotate relative to the hinge bracket 12a and the front leg 40. When the link mechanism is operated in order to switch the seat from the use condition to the retracted condition, the front leg 40 is rotated relative to the cushion frame 12 around the pin 201.

Figure 22:
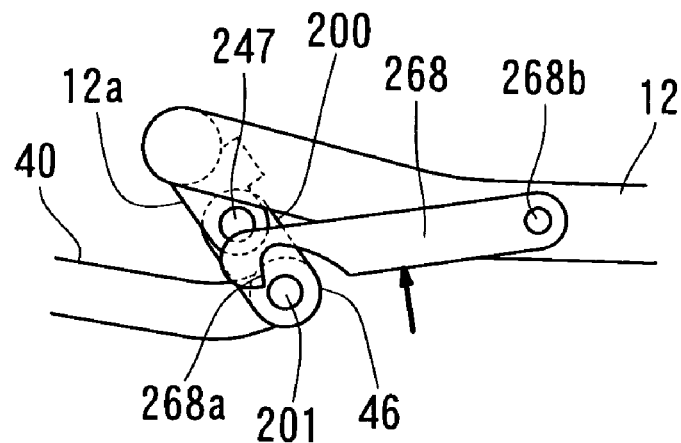
FIG. 22 is a partially side view of the frame assembly, illustrating a condition in which a seat back is tilted forwardly to a desired tilted position.
Figure 23:
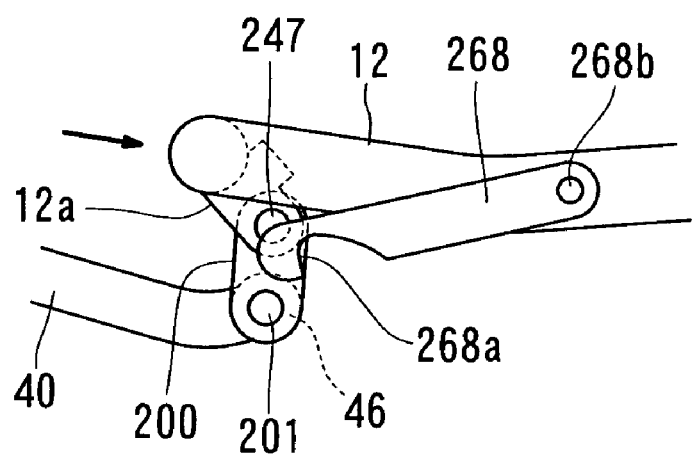
FIG. 23 is a partially side view of the frame assembly, illustrating a condition in which the seat back is further tilted forwardly.

When the front leg 40 is rotated to a desired position, as shown in FIG. 22, the restriction lever 268 is rotated. As a result, the hook portion 268a of the restriction lever 268 is disengaged from the pin 201 so that the link member 200 can be rotatable relative to the hinge bracket 12a of the cushion frame 12 and the upper supporting portion 46 of the front leg 40. Therefore, when the front leg 40 is further rotated or tilted, as shown in FIG. 23, the link member 200 rotates relative to the hinge bracket 12a and the upper supporting portion 46 so that the cushion frame 12 is moved rearwardly. Thus, the compensation mechanism that comprises the link member 200 may effectively compensate for a difference between a rotating range of the front and rear legs 40 and 60.

Representative examples of the present invention have been described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the foregoing detail description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present teachings.

What is claimed is:

1. A retractable seat to be attached to a floor, comprising:
    a seat cushion;
    a seat back rotatably supported on the seat cushion;
    a link mechanism for supporting the seat cushion on the floor, the link mechanism including a front leg and a rear leg that are each pivotally connected to the seat cushion and the floor, the front and rear legs being arranged and constructed to rotate in the same direction relative to the floor, thereby moving the seat cushion so that the seat can be switched between a use condition and a retracted condition, the front and rear legs respectively having a different link length so as to produce a difference between a rotating range of the front leg and a rotating range of the rear leg; and
    a compensation mechanism for compensating for the difference between the rotating ranges of the front and rear legs within an operating range of the link mechanism.

2. A retractable seat as defined in claim 1, wherein the compensation mechanism comprises a movable connecting mechanism provided to a connecting portion of the link mechanism, the movable connecting mechanism being arranged and constructed to move the connection portion in a longitudinal direction of the seat when the seat is changed between the use condition and the retracted condition.

3. A retractable seat as defined in claim 2, wherein the movable connecting mechanism comprises a hinge pin attached to one of the front and rear legs, and an elongated hole formed in a bracket mounted on the floor, the elongated hole slidably receiving the hinge pin.

4. A retractable seat as defined in claim 3, wherein the hinge pin is attached to the rear leg.

5. A retractable seat as defined in claim 2, wherein the movable connecting mechanism comprises a hinge pin attached to one of the front and rear legs, and an elongated hole formed in the seat cushion, the elongated hole slidably receiving the hinge pin.

6. A retractable seat as defined in claim 5, wherein the hinge pin is attached to the rear leg.

7. A retractable seat as defined in claim 2, wherein the movable connecting mechanism comprises a link member pivotally provided between the front leg and the seat cushion.

8. A retractable seat as defined in claim 2 further comprising a restriction mechanism that can lock the movable connecting mechanism when the seat is in the use condition.

9. A retractable seat as defined in claim 8, wherein the restriction mechanism comprises a spring member that elastically force the movable connecting mechanism.

10. A retractable seat as defined in claim 1, wherein the floor is formed with a receiving recess for receiving the seat, and the rear leg is pivotally connected to the floor within the receiving recess, wherein the front leg has a link length greater than the rear leg, and wherein the link mechanism is arranged and constructed to be tilted rearwardly when the seat is changed from the use condition to the retracted condition.

11. A retractable seat as defined in claim 10, wherein the seat comprises a rear seat.

12. A retractable seat to be attached to a floor, comprising:
    a seat cushion;
    a seat back rotatably supported on the seat cushion;
    a link mechanism for supporting the seat cushion on the floor, the link mechanism including a front leg and a rear leg that are each pivotally connected to the seat cushion and the floor, the front and rear legs being arranged and constructed to rotate in the same direction relative to the floor, thereby moving the seat cushion so that the seat can be switched between a use condition and a retracted condition, the front and rear legs respectively having a different link length so as to produce a different between a rotating range of the front leg and a rotating range of the rear leg;
    a compensation mechanism for compensating for the difference between the rotating ranges of the front and rear legs within an operating range of the link mechanism, the compensation mechanism comprising a hinge pin and an elongated hole slidably receiving the hinge pin; and
    a restriction mechanism that can retain the hinge pin at a desired position within the elongated hole when the seat is in the use condition.

13. A retractable seat as defined in claim 12, wherein the restriction mechanism comprises a spring member that elastically applies force on the hinge pin.

14. A retractable seat as defined in claim 12, wherein the floor is formed with a receiving recess for receiving the seat, and the rear leg is pivotally connected to the floor within the receiving recess, wherein the front leg has a link length greater that the rear leg, and wherein the link mechanism is arranged and constructed to be tilted rearwardly when the seat is changed from the use condition to the retracted condition.

15. A retractable seat as defined in claim 14, wherein the seat comprises a rear seat.

* * * * *